United States Patent
Lindberg et al.

(10) Patent No.: US 10,152,533 B2
(45) Date of Patent: Dec. 11, 2018

(54) SYSTEM, METHOD AND INTERFACE FOR PROVIDING A SEARCH RESULT USING SEGMENT CONSTRAINTS

(71) Applicants: Erik M. Lindberg, Minneapolis, MN (US); Andrew Christian Puzder, Eagan, MN (US); Isabelle Moulinier, Richfield, MN (US); Dietmar H. Dorr, Sunnyvale, CA (US); Benjamin D. Anderson, Fairport, NY (US)

(72) Inventors: Erik M. Lindberg, Minneapolis, MN (US); Andrew Christian Puzder, Eagan, MN (US); Isabelle Moulinier, Richfield, MN (US); Dietmar H. Dorr, Sunnyvale, CA (US); Benjamin D. Anderson, Fairport, NY (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 429 days.

(21) Appl. No.: 13/654,976

(22) Filed: Oct. 18, 2012

(65) Prior Publication Data

US 2014/0114981 A1 Apr. 24, 2014

(51) Int. Cl.
*G06F 17/30* (2006.01)

(52) U.S. Cl.
CPC .. *G06F 17/30616* (2013.01); *G06F 17/30719* (2013.01)

(58) Field of Classification Search
CPC ............... G06F 17/30616; G06F 17/30719
See application file for complete search history.

(56) References Cited

U.S. PATENT DOCUMENTS 6,633,868 B1 * 10/2003 Min .................. G06F 17/30864
2004/0199498 A1 * 10/2004 Kapur ............... G06F 17/30672
(Continued)

FOREIGN PATENT DOCUMENTS

| AU | 2013331585 B2 | 2/2017 |
|----|---|---|
| CA | 2 896 700 A1 | 4/2014 |

(Continued)

OTHER PUBLICATIONS

Brin et al., "The anatomy of a large-scale hypertextual Web search engine", Computer Networks and ISDN Systems 30, pp. 107-117, 1998, Elsevier Science B.V.*

(Continued)

*Primary Examiner* — Tarek Chbouki

(57) ABSTRACT

A method for providing a search result includes receiving a user query and determining, in response to receiving the user query, a set of segment candidates based on the user query and an indexing structure. The indexing structure is associated with at least one segment constraint. The method further includes ranking the set of segment candidates and providing a result associated with the set of segment candidates. Another method includes ranking each segment within the set of segment candidates based on a set of prioritized features. Another method has the at least one segment constraint including at least one of a critical keyword and an exclusionary keyword. Another method further includes excluding a segment based on the at least one segment constraint comprising the exclusionary keyword.

10 Claims, 6 Drawing Sheets

(56) References Cited

U.S. PATENT DOCUMENTS

| | | | |
|---|---|---|---|
| 2009/0089277 A1* | 4/2009 | Cheslow | 707/5 |
| 2009/0216736 A1 | 8/2009 | Dexter et al. | |
| 2009/0245579 A1* | 10/2009 | Hu | G03B 13/00 |
| | | | 382/103 |
| 2010/0125601 A1 | 5/2010 | Jackson et al. | |
| 2010/0174716 A1 | 7/2010 | Elbaz et al. | |
| 2011/0035374 A1* | 2/2011 | Vadrevu et al. | 707/728 |
| 2011/0289028 A1 | 11/2011 | Sato | |
| 2012/0096029 A1* | 4/2012 | Tamura | G06F 17/2765 |
| | | | 707/772 |

FOREIGN PATENT DOCUMENTS

| | | |
|---|---|---|
| GB | 2522369 A | 7/2015 |
| WO | 2014/062563 A1 | 4/2014 |

OTHER PUBLICATIONS

Noruzi, "Google Scholar: The New Generation of Citation Indexes", Libri, vol. 55, pp. 170-180, 2005, Saur.*

Leung et al., "Personalized Concept-Based Clustering of Search Engine Queries", IEEE Transactions on Knowledge and Data Engineering, vol. 20, No. 11, pp. 1505-1518, Nov. 2008, IEEE.*

Patent Examination Report dated Oct. 4, 2016, issued in corresponding Australian Patent Application No. 2013331585.

International Search Report and Written Opinion issued in corresponding PCT Application No. PCT/US2013/064822, dated Feb. 7, 2014, 6 pages.

International Preliminary Report on Patentability issued in corresponding PCT Application No. PCT/US2013/064822, dated Apr. 30, 2015, 6 pages.

First Examination Report dated Feb. 23, 2016, issued in corresponding Australian Patent Application No. 2013331585, 3 pages.

Response to First Examination Report dated Sep. 6, 2016 filed in corresponding Australian Patent Application No. 2013331585, 14 pages.

Response to Second Office Action dated Nov. 30, 2016 filed in corresponding Australian Patent Application No. 2013331585, 11 pages.

Notice of Acceptance dated Jan. 12, 2017 received in corresponding Australian Patent Application No. 2013331585, 3 pages.

First Examination Report dated Jun. 16, 2015, received in corresponding New Zealand Application No. 707405, 5 pages.

Further Examination Report dated Jul. 29, 2015, received in corresponding New Zealand Application No. 707405, 5 pages.

Response to Examination Report dated Sep. 4, 2015, filed in corresponding New Zealand Application No. 707405, 36 pages.

Further Examination Report dated Sep. 23, 2015, received in corresponding New Zealand Application No. 107405, 3 pages.

Response to Examination Report dated Jan. 19, 2016, filed in corresponding New Zealand Application No. 107405, 36 pages.

Further Examination Report dated Feb. 17, 2016, received in corresponding New Zealand Application No. 107405, 5 pages.

* cited by examiner

SYSTEM, METHOD AND INTERFACE FOR PROVIDING A SEARCH RESULT USING SEGMENT CONSTRAINTS

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2012 Thomson Reuters.

TECHNICAL FIELD

Various embodiments of the present invention concern a system, method and interface for providing a search result using segment constraints.

BACKGROUND

Utilizing search engines has become common place for most consumers over the past decade. What once was a technology that only scientists and technologists employed to search information, is now being conquered by toddlers. According to comScore's March 2012 search engine rankings, Google® sites lead the U.S. market in March with a 66.4% market share. There were 18.4 billion searches conducted in March with Google® ranking first with 12.2 billion searches.

Consumers are craving information from "What does a hippopotamus look like?" to "What are my legal rights during a criminal case?" Search engines like Google® and Yahoo!® have the world as their consumers with a wealth of documents, websites, blogs, and content available for searching. However, the algorithms running the worldwide search engines fall short if a user is trying to find a specific, current answer about a particular issue, for example, a legal issue. For instance, if a user were to type in "fmla disability legal issue" into Google® search engine, the results are tailored towards explaining the acronym, FMLA (Family Medical Leave Act), and the information with which an individual needs to be aware. Consequently, this information does not help a professional, such as an employment attorney, keep up to date on the current legal awareness of the FMLA and provide information regarding questions the attorney may have about the legal issues surrounding FMLA to enable the attorney to provide legal advice. In other words, worldwide search engines cast a virtual wide net to gather as much information as possible relating to a user query. This information is then served up to the consumer for him/her to sift through to see if those documents answer his/her question. Unfortunately, professionals do not have the time, or usually the patience, to sift through various search results. A professional wants specific information quickly, efficiently and most of all located at the top of the results webpage.

Accordingly, the present inventors identified a need for improving a search result using segment constraints.

SUMMARY

The inventors propose an automated technique to provide search results using segment constraints by receiving a user query and determining, in response to receiving the user query, a set of segment candidates. The set of segment candidates are based on the user query and an indexing structure. The indexing structure is associated with at least one segment constraint. The method further includes ranking the set of segment candidates and providing a result associated with the set of segment candidates. Another method includes ranking each segment within the set of segment candidates based on a set of prioritized features. In addition, providing a search result using segment constraints may further include a segment constraint being a critical keyword and/or an exclusionary keyword. Another method further includes excluding a segment based on the at least one segment constraint comprising the exclusionary keyword.

One advantage of the improvement is to better provide professionals with specific information to current research questions. For example, an attorney may be provided with specific, legal information to the legal question of "What are the legal issues surrounding FMLA and disability?" using a legal research information retrieval service such as WestlawNext™. Additionally, this improvement encompasses new content that is created and presented to users in new ways. For example, the new content addresses real-world research questions attorneys have. For instance, the current law a litigator needs to know on an issue in a particular jurisdiction is integrated with succinct, practice-oriented guidance from outside attorneys who have experience dealing with that area of the law. The improvement enables an online research information retrieval service to identify the specific segment of a document that is most responsive to a user's question. A reference to that segment is then presented at the top of the webpage interface with a special visual emphasis.

Additional advantages and/or features of the present invention will be set forth in part in the description. It is to be understood that both the foregoing general description and the following detailed description of the present invention are exemplary and explanatory and are intended to provide further explanation of the present invention as claimed.

DETAILED DESCRIPTION OF THE EXEMPLARY EMBODIMENT(S)

Figure 2:
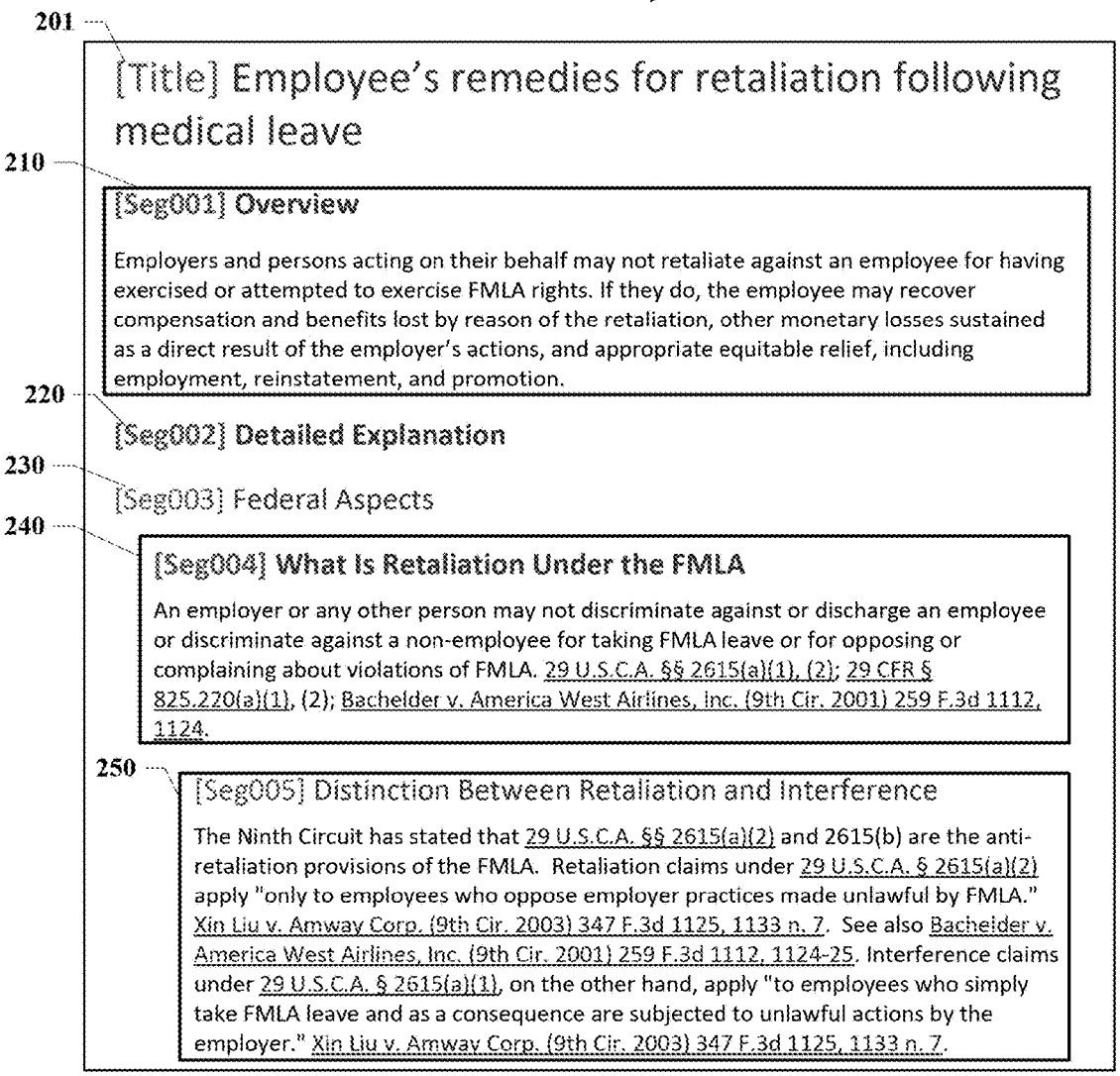
FIG. 2 is an exemplary template 200 which corresponds to one or more embodiments of the invention.
Figure 4:
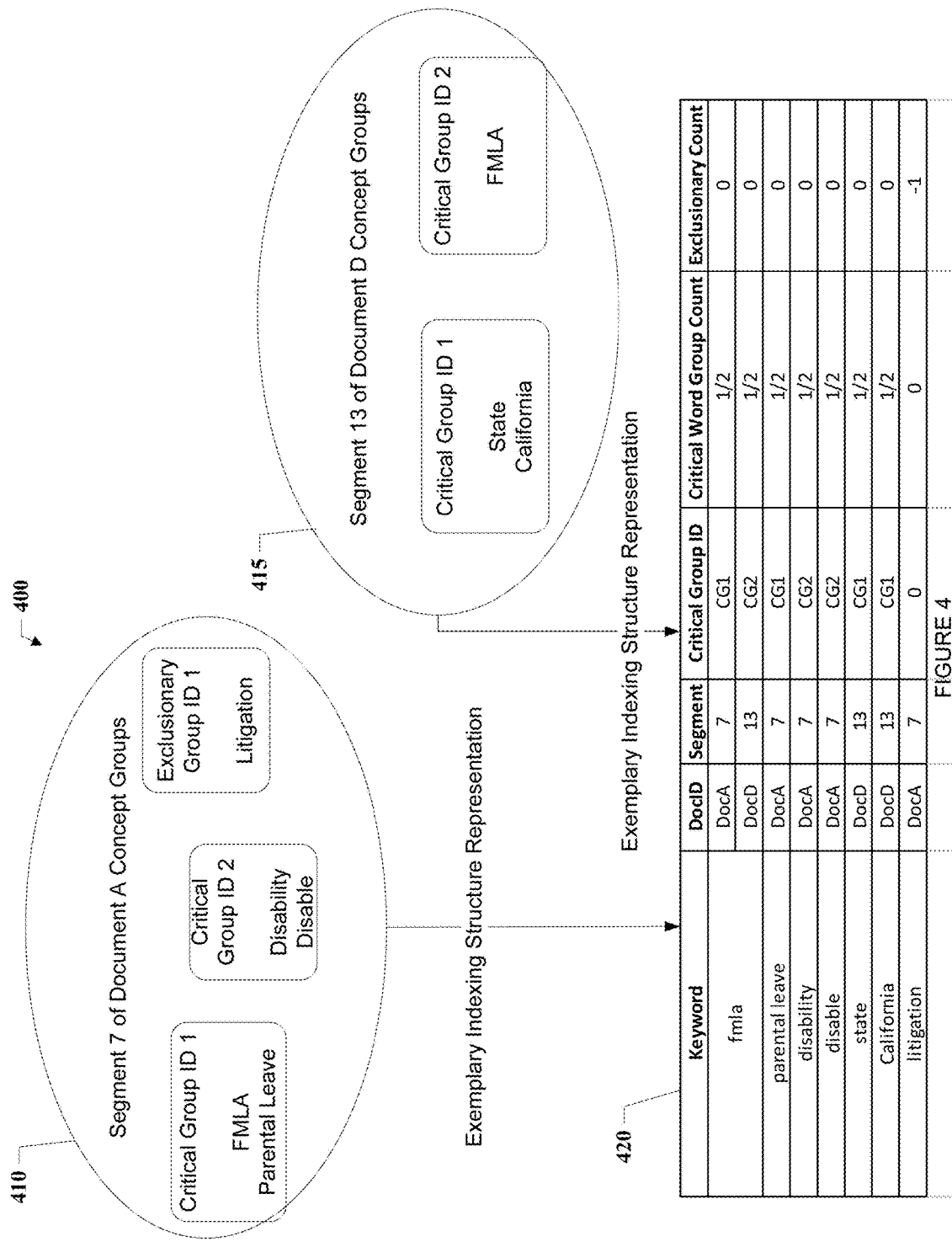
FIG. 4 includes an exemplary indexing structure 420 which corresponds to one or more embodiments of the invention.

The description includes many terms with meanings derived from their usage in the art or from their use within the context of the description. However, as a further aid, the following examples are presented. A segment is a portion of text. Exemplary segments may include but are not limited to a phrase, header, title, sentence, one or more paragraphs, a document and the like. A segment constraint is a concept related to a corresponding segment. Exemplary segments are illustrated in FIG. 2 and discussed in the corresponding specification. A segment candidate is a segment that has been determined as a contender for possible retrieval and, ultimately, display to a user. Exemplary segment candidates are explained in working examples 1 and 2 within the specification. A segment constraint may also be called a concept group. Exemplary segment constraints are shown in FIG. 4 and discussed in the corresponding specification. There are at least three types of segment constraints: 1) critical, 2) exclusionary and 3) supplemental. A critical segment constraint is a related concept that is primary to the corresponding segment. An exclusionary segment constraint is a related concept that is not present within the corresponding segment. A supplemental segment constraint is a related concept that is a secondary concept to the corresponding segment. An indexing structure is a data structure that improves the speed of data retrieval operations and is associated with a segment constraint. An exemplary indexing structure 420 is illustrated in FIG. 4 and discussed in the corresponding specification. One example of an indexing structure may be a trie structure. A trie structure is a compact data structure for representing a set of strings, such as all the words in a text. A keyword is a word and/or phrase of significance. For example, a keyword within a segment constraint is of significance to that concept related to the given segment constraint.

Exemplary System

Figure 1:
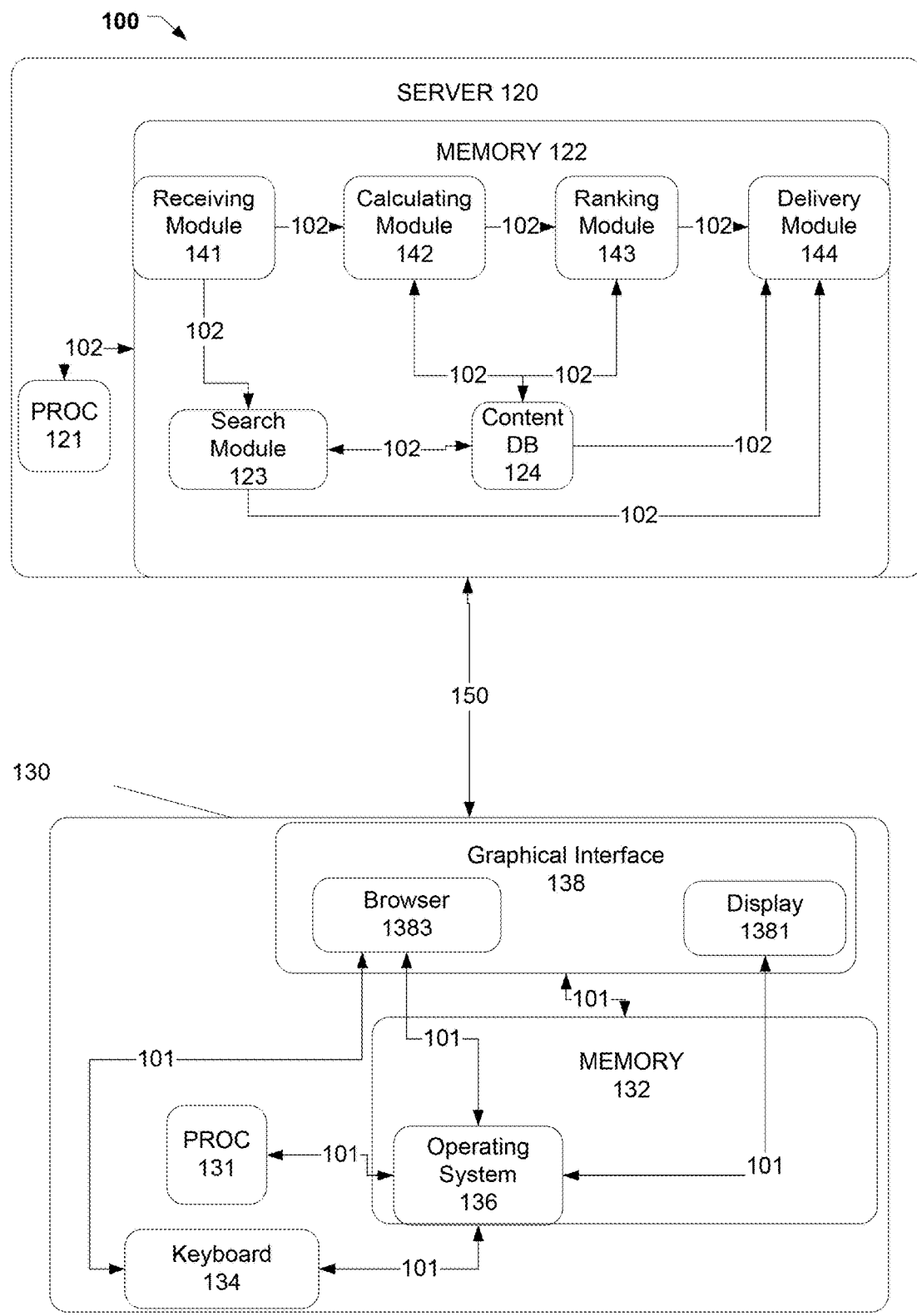
FIG. 1 is an exemplary system 100 which corresponds to one or more embodiments of the invention.

FIG. 1 shows an exemplary system 100, respectively, which may be adapted to incorporate the capabilities, functions, methods, and interfaces of the present invention. System 100 includes a server 120 and an access device 130. Server 120 is generally representative of one or more servers for serving data in the form of a webpage or other markup language with associated applets, ActiveX controls, and/or other related software and data structures. In addition, server 120 transmits a signal via a wireless or wireline transmission channel 150 to at least one access device, such as access device 130. For example, a wireless or wireline transmission channel 150 may be associated with a request to send a search result to access device 130. Server 120 includes a processor module 121 and a memory 122, wherein the memory 122 further includes software modules 141, 142, 143 and 144, a search module 123 and a content database 124. As shown in FIG. 1, in one embodiment, the software modules include a receiving module 141, a calculating module 142, a ranking module 143 and a delivery module 144. Details of the software modules 141, 142, 143 and 144 configured in memory 122 are discussed in further detail below. Processor module 121 and memory 122 are connected via computer bus 102, which is shown in server 120. Computer buses 101 and/or 102 are buses that transmit information between the access device's components/elements and/or between multiple access devices. For example, computer bus 101 and computer bus 102 aid in transmitting information (e.g., a signal) within access device 130 and server 120, respectively. Processor module 121 may use computer bus 102 to queue a request that is to be transmitted through a signal, from server 120, via a wireless or wireline transmission channel 150 and is then ultimately received by the processor module 131 through the utilization of computer bus 101. Generally, server 120 transmits the signal via a wireless or wireline transmission channel 150 to at least one access device, such as access device 130.

Processor module 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores software modules 141, 142, 143 and 144, a search module 123 and a content database (DB) 124.

Search module 123 includes one or more search engines and related user-interface components (not shown), for receiving and processing queries against content database 124. An exemplary search engine module is described in U.S. patent application Ser. No. 11/538,749 entitled "Systems, Methods, And Software For Identifying Relevant Legal documents." This application is herein incorporated by reference. Content database 124 takes the exemplary form of one or more electronic, magnetic, and/or optical data-storage devices. Content database 124 includes content relating to one or more user queries, one or more indexing structures, one or more electronic documents, one or more concept groups, one or more sets of segment candidates, search information, any calculation values and the like. The electronic documents may be related to legal, financial, scientific, tax and/or accounting information. The content and/or a subset of the content within the content database 124 may be subscriber content. Subscriber content includes content and related data for controlling, administering, and managing pay-as-you-go and/or subscription based access. For instance, a user may have to subscribe to a legal research information retrieval service (e.g., WestlawNext™). The content is stored in the content database 124 and cannot be accessed until a set of user credentials are authenticated. For instance, user credentials may be a user name and associated password. Once the credentials are successfully authenticated on server 120, a delivery signal, associated with at least one updated authority record, is transmitted via the wireless or wireline transmission channel 150 to access device 130. For purposes described herein, successfully authenticating a set of user credentials means the user credentials were accepted by an authentication system (not shown but well known to those skilled in the art).

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a personal computer which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor module 131 reads data, instructions, messages or message packets, and other computer readable information from the computer readable medium.

In one exemplary embodiment, memory 132 stores code (machine-readable or executable instructions) for an operating system 136. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor module 131. For example, the keyboard 134 sends inputs, via computer bus 101, to the operating system 136. The operating system 136 then determines which one or more of the software modules 141, 142, 143 and 144 needs to be utilized, engages the given software module through the signal via a wireless or wireline transmission channel 150, accepts the software module output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When one or more of the software modules 141, 142, 143 and 144 are initiated, a display 1381 is defined in memory 132 and rendered on graphical interface 138. Upon rendering, the graphical interface 138 presents the data/results in association with the set of instructions from the delivery module 144 as further discussed herein.

Exemplary Method and Working Example

Prior to exemplary method 500 commencing, several items need to be created including: 1) a template, 2) a concept group (also referred to as a group or grouping) and 3) an indexing structure. Each item is discussed herein. FIG. 2 represents an exemplary template 200 of a document. An exemplary template is a document that aids an editorial process by creating a hierarchical document structure. For example, there is a title and a listing of segments. In FIG. 2, there is a title 201 and five (5) segments 210, 220, 230, 240 and 250. An exemplary segment could be just a header for the hierarchical document structure such as segment sections 220 and 230. Another exemplary segment could be a header along with substance regarding the topic of the corresponding header such as sections 210, 240 and 250. In addition, one skilled in the art would appreciate that while the example illustrates an editorially created template 200, known systems and methods could be used to determine segments within a document. For example, a news article may be downloaded from the internet and a parsing program can determine the different segments within the news article. The template 200 is stored in content database 124.

Figure 3:
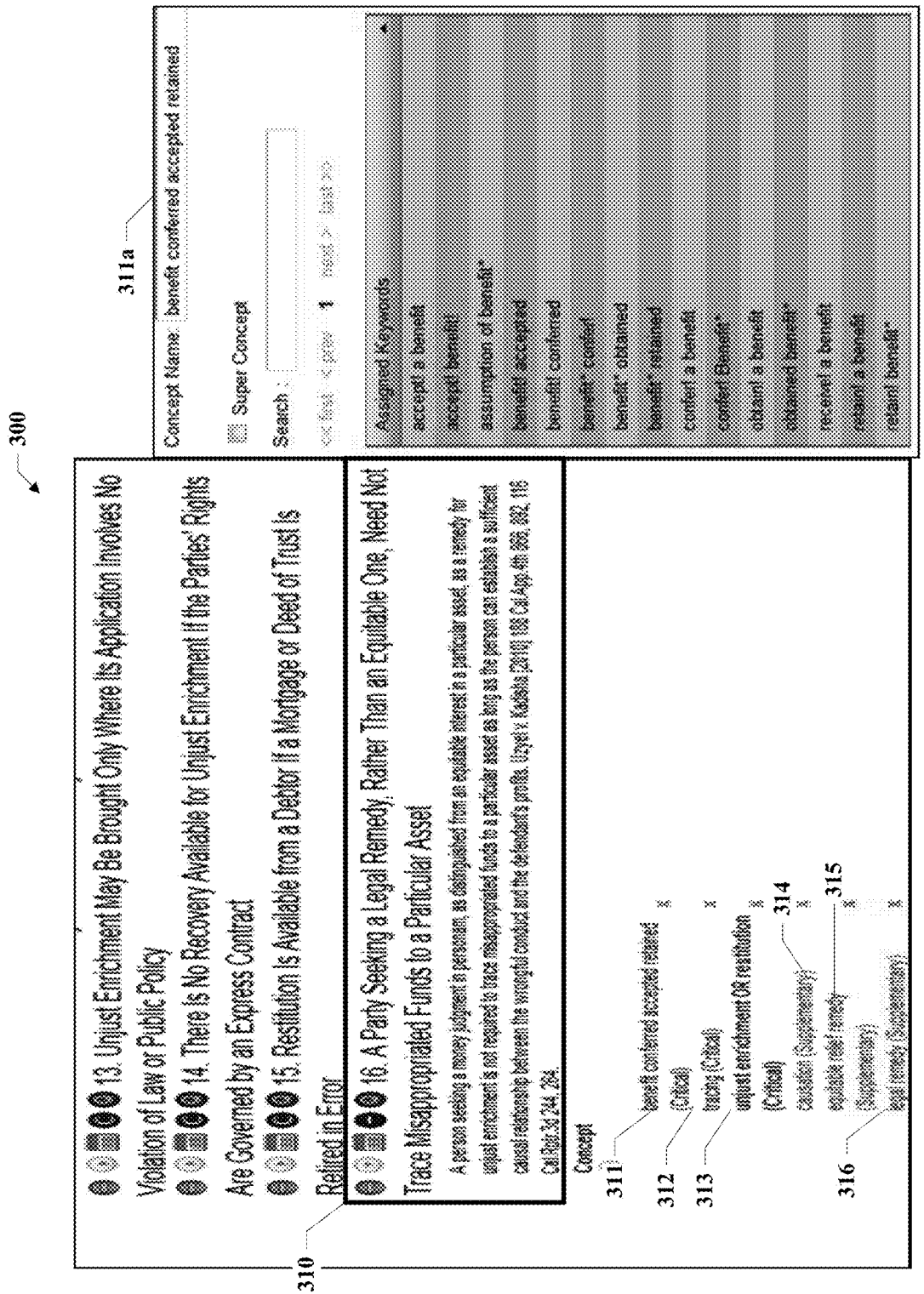
FIG. 3 is an exemplary editorial interface 300 which corresponds to one or more embodiments of the invention.

FIG. 3 represents an exemplary editorial interface 300 that includes exemplary concept groups relating to segments within the template 200. For each segment that has more than a header or title, a determination is made as to whether each segment should have a concept group. If the segment should have a concept group, a further determination is made as to one or more concept groups. These concept groups are also known as segment constraints. There are three (3) types of segment constraints: 1) critical, 2) exclusionary and 3) supplemental. A critical segment constraint is a related concept that is primary to the corresponding segment. An exclusionary segment constraint is a related concept that is not present within the corresponding segment. A supplemental segment constraint is a related concept that is a secondary concept to the corresponding segment. For example, segment 16 310 has three (3) critical segment constraints: 1) "benefit conferred accepted retained" 311, 2) "tracing" 312 and 3) "unjust enrichment OR restitution" 313, zero (0) exclusionary segment constraints and three (3) supplemental segment constraints: 1) "causation" 314, 2) "equitable relief remedy" 315 and 3) "legal remedy" 316. For each type of segment constraint, there may be a listing of keywords assigned. For example, for the critical segment constraint "benefit conferred accepted retained" 311, there is a listing of critical keywords 311*a* assigned. Keywords may be critical, supplemental and/or exclusionary based on the concept group to which the keyword is applicable. Keywords may be assigned as a critical keyword for one segment but as an exclusionary keyword for another segment. In this example, the listing of critical keywords 311*a* includes other words that convey the same meaning as "benefit conferred accepted retained." For example, the word "accepted" can be stemmed to include the root word "accept" and/or other variations with the root expander "accept!." A root expander allows for retrieval of all possible endings of that root such as acceptance, accepted, accepts, accepting and the like for "accept!." In addition, the keywords may also include a universal character (*). The universal character (*) represents one character. The universal character may be placed within or at the end of a term. When the universal character is placed within a term, it requires that a character appear in that position. For example, fea*t retrieves feast but not feat. When the universal character is placed at the end of a term, a maximum length of that term may be specified. For example, object* retrieves object, objects, objected, objective, objection and objecting but not objectionable. Referring back, the groups/segment constraints are stored in content database 124. In some embodiments, the segment constraints may be used at different points within method 500 (refer to FIG. 5 and corresponding written description). For example, critical and exclusionary segment constraints may be used to determine segment candidates while supplemental segment constraints may be used to rank the set of segment candidates. An example of the different uses is described later herein. One skilled in the art would appreciate that while a previous example illustrates an editorial interface 300** that includes exemplary editorial concept groups relating to segments, the concept groups may be also determined programmatically and/or with a combination of editorial and programmatic systems, methods and interfaces.

FIG. 4 represents an illustration 400 of an exemplary indexing structure 420 based on segment 7 of document A concept groups 410 and segment 13 of document D concept groups 415. As stated previously, a concept group is a segment constraint having one or more keywords associated with that segment constraint. In FIG. 4, exemplary segment 7 (not related to segments in FIG. 3) has two (2) critical segment constraints: Critical Group ID 1 and Critical Group ID 2. In addition, segment 7 has one (1) exclusionary segment constraint: Exclusionary Group ID 1. However, segment 7 of document A does not have any supplemental segment constraints. Exemplary segment 13 (not related to segments in FIG. 3) has two (2) critical segment constraints: Critical Group ID 1 and Critical Group ID 2. However, segment 13 of document D does not have any supplemental or exclusionary segment constraints. After the segment constraints are defined, the segment constraints are formatted into an exemplary indexing structure 420. An exemplary indexing structure may be a trie structure. In the exemplary embodiment, the trie structure is representing all the segment constraints. In this exemplary indexing structure 420, six (6) columns or pieces of information are illustrated. The first column is a listing of the keywords for all documents within a corpus. The second column is a listing of unique document identifiers such as "DocA" for document A. The third column is a listing of the segment number within a document such as (7) for segment 7 of document A or (13) for segment 13 of document D. The fourth column is the Critical Group ID number. For example, the phrase "parental leave" is part of Critical Group ID 1 for segment 7 of document A. Thus, the notation for the given group is "CG1." The fifth column is labeled as the critical word group count (CWGC) for a given critical group where the equation is:

$$\text{CWGC VALUE} = 1/(\text{Total Number of Critical Concept Groups for a Given Segment})$$

For example, there are two critical segments constraints/groups for segment 7 of document A. Therefore, each keyword within the set of critical groups for segment 7 of document A is given a CWGC value of ½ in column four (4) for CG1 and CG2. In another example, there are two critical segment constraints for segment 13 of document D. Thus, each keyword within the set of critical groups for segment 13 of document D is given a CWGC value of ½ in column four (4) for CG1 and CG2. The sixth column is the exclusionary count. Each exclusionary keyword is given a (−1) to offset the later calculation. In some embodiments, the exclusionary count value may differ. As long as the value has the potential to exclude a potential segment from being a candidate, the selected value can vary. In addition, the indexing structure includes keywords from multiple documents and segments corresponding to its given document. For instance, in the exemplary indexing structure 420, there is only one segment for each of documents A and D listed. In other instances, the indexing structure may also include other segments corresponding to documents A and D and/or other documents. Either way, the indexing structure 420 is stored in content database 124. Once the indexing structure is stored, method 500 may commence.

Figure 5:
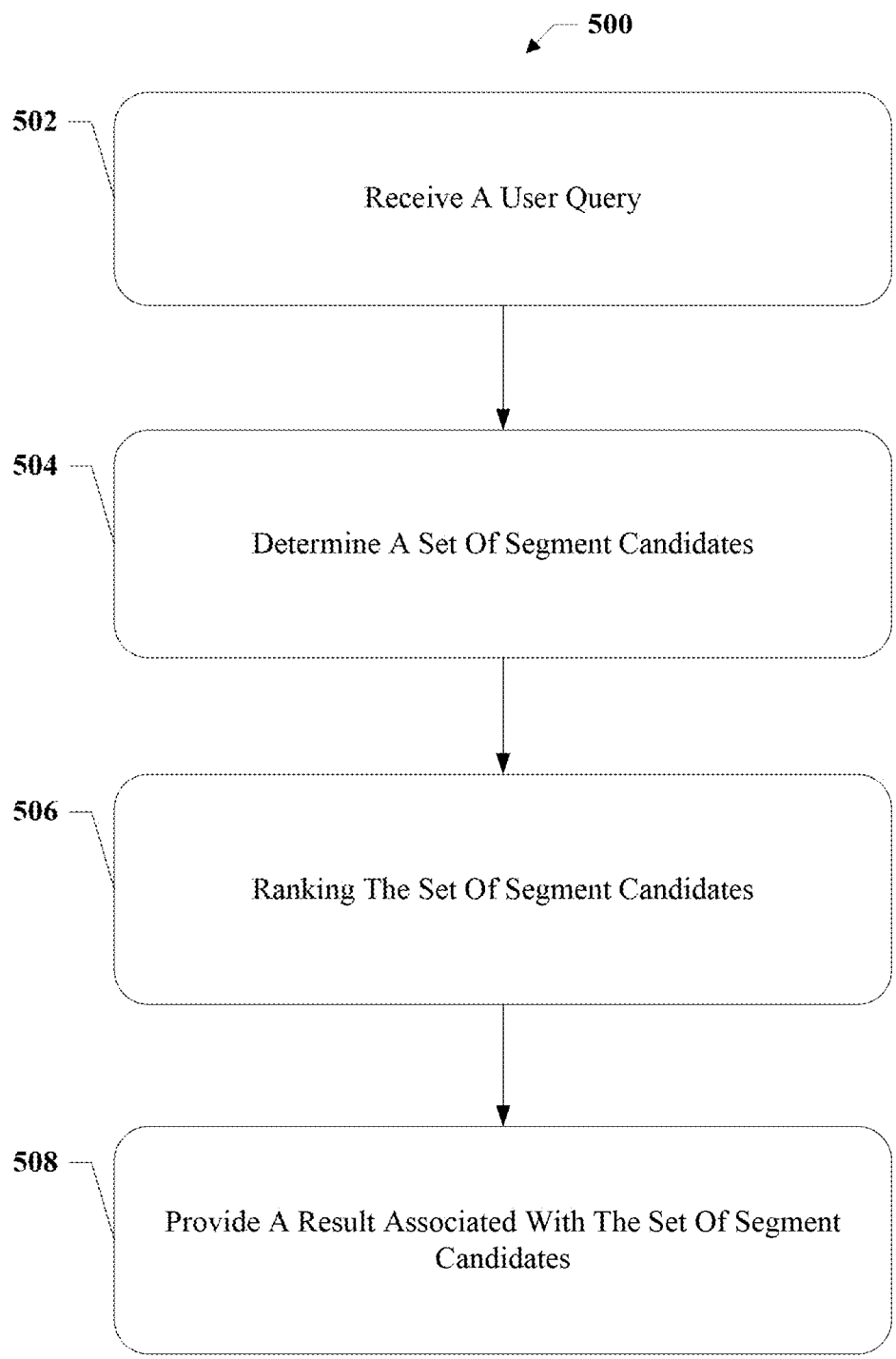
FIG. 5 in an exemplary method 500 which correspond to one or more embodiments of the invention.

FIG. 5 shows an exemplary method 500. Method 500 includes functional blocks 502-508. These functional blocks are steps that perform actions including assignments, decisions, assessments and other like functions.

In step 502, the receiving module 141 receives a user query. The user query may come from a user of a legal research information retrieval service. As part of working example #1, a legal research user may use WestlawNext™ to search for a specific answer to a legal question. The legal researcher may input the following user query "fmla disability" into WestlawNext™. The user query is received by the receiving module 141. In some embodiments, after receiving the user query in the receiving module 141, the user query, via computer bus 102, is sent to the search module 123 to execute a separate search request based on the user query. In other embodiments, the user query may be normalized. Normalization is known to those skilled in the art. For example, the word "disability" in the user query may be normalized to only have the root word "disabl" in order to have a wider breadth of search results. The process of reducing a word to its root is known as stemming. Stemming is one of many normalization techniques known to those skilled in the art. Referring back to the current working example, once the user query is received, the process moves to step 504.

In step 504, the calculating module 142 determines a set of segment candidates. This determination is made using the received user query and an indexing structure 420. In addition, the indexing structure 420 is associated with at least one segment constraint. As explained previously, critical segment constraints include critical keywords, exclusionary segment constraints include exclusionary keywords and/or supplemental segment constraints include supplemental keywords. In the current working example #1, the user query "fmla disability" has been received by the receiving module 141 and is now used to determine which segment candidates would represent the set of segment candidates. The user query is compared against the indexing structure 420 to determine which segments, if any, are candidates. For each segment that contains a user query term, if the value of the following segment candidate equation equals one (1), then the given segment is a candidate. If the value of the segment candidate equation does not equal one (1), then the given segment is not a candidate. The segment candidate equation is as follows:

$$\text{Seg } X, \text{Doc} Y \text{ VALUE} = \text{SUM}(\text{CWGC}_{CG1} + \text{CWGC}_{CG2} \ldots \text{CWGC}_{CGn}) + \text{Exclusionary Count,}$$

where the sum is the addition of the critical word group count values for CG1, CG2 to CGn. If a term in the user query matches a keyword in column one (1) of the indexing structure 420, then add the corresponding critical word group count value for the given Critical Group ID. In the current embodiment, each critical word group count value is only counted once per critical group for a given segment. If the sum of the added critical word group count values is equal to one (1), then the segment is a candidate. Using the user query "fmla disability" and the indexing structure 420 from FIG. 4, it can be determined that there are two potential segment candidates that have the keyword "fmla," segment 7 of document A and segment 13 of document D. In addition, there is one potential segment candidate that has the keyword "disability," segment 7 of document A. Therefore, the two potential segment candidates are segment 7 of document A and segment 13 of document D. The calculating module 142 uses the segment candidate equation mentioned above, along with the indexing structure 420, to calculate a value for each of the aforementioned potential segment candidates. Each calculation is described herein. For segment 7 of document A, the keywords "fmla" and "parental leave" are part of Critical Group ID 1 (CG1) according to the indexing structure 420, in particular column four (4). The keywords "disability" and "disable" are part of Critical Group ID 2 (CG2). The keyword "litigation" is part of the Exclusionary Group ID 1. The first term in the user query is "fmla" which corresponds to Critical Group ID 1 for segment 7 of document A. Subsequently, the indexing structure 420, in particular column five (5), is consulted to determine that the critical word group count value for CG1 for segment 7 of document A is ½. This ½ value is then populated into the segment candidate equation for $\text{CWGC}_{CG1}$. The second term in the user query is "disability" which corresponds to Critical Group ID 2 for segment 7 of document A. Subsequently, the indexing structure 420, in particular column five (5), is consulted to determine that the critical word group count value for CG2 for segment 7 of document A is ½. This ½ value is then populated into the segment candidate equation for $CWGC_{CG2}$. In this example, there are no more terms in the user query. Thus, there are no user query terms that are part of an exclusionary group for segment 7 of document A. Consequently, the exclusionary count is zero. Now inputting the values into the equation:

Seg 7, DocA VALUE=SUM(½+½)+0=1 wherein $CWGC_{CG1}$=½ and $CWGC_{CG2}$=½ and exclusionary count is 0. With the value being one (1), segment 7 for document A is a segment candidate for this user query.

For segment 13 of document D, the keywords "California" and "state" are part of Critical Group ID 1 (CG1). The keywords "fmla" and "parental leave" are part of Critical Group ID 2 (CG2). The first term in the user query is "fmla" which corresponds to Critical Group ID 2 for segment 13 of document D. Subsequently, the indexing structure 420, in particular column five (5), is consulted to determine that the critical word group count value for CG2 for segment 13 of document D is ½. This ½ value is then populated into the segment candidate equation for $CWGC_{CG2}$. Next, the second term in the user query is "disability" which does not corresponds to any critical group for segment 13 for document D. In this example, there are no more terms in the user query. Thus, there are no user query terms that are part of Critical Group ID 1 or an exclusionary group for segment 13 for document D. Consequently, the $CWGC_{CG1}$ value for segment 13 for document D is zero and the exclusionary count is zero. Inputting the values into the segment candidate equation for segment 13 of document D is as follows:

Seg 13,DocD VALUE=SUM(0+½)+0=½ wherein $CWGC_{CG1}$=0,$CWGC_{CG2}$=½ and the exclusionary count is 0. With the value being ½, segment 13 for documentD is not a segment candidate for this user query.

In working example #2, the user query received from the receiving module 141 is "fmla 'parental leave' disability litigation." Using the given user query and the indexing structure 420 from FIG. 4, it can be determined that there are two potential candidates that have the user query term "fmla," segment 7 of document A and segment 13 of document D. There is one potential candidate that has the user query term "parental leave," segment 7 of document A. In addition, there is one potential candidate that has the user query term "disability," segment 7 of document A. Furthermore, the user query term "litigation" is part of an exclusionary group for segment 7 of document A. Therefore, the two potential segment candidates are segment 7 of document A and segment 13 of document D. The calculating module 142 uses the segment candidate equation mentioned above, along with the indexing structure 420, to calculate a value for each of the aforementioned potential segment candidates. Each calculation is described herein. For segment 7 of document A, the keywords "fmla" and "parental leave" are part of Critical Group ID 1 (CG1) according to the indexing structure 420, in particular column four (4). The keywords "disability" and "disable" are part of Critical Group ID 2 (CG2). The keyword "litigation" is part of Exclusionary Group 1. The first term in the user query is "fmla" which corresponds to Critical Group ID 1 for segment 7 of document A. Subsequently, the indexing structure 420, in particular column five (5), is consulted to determine that the critical word group count value for CG1 for segment 7 of document A is ½. The ½ value is then populated into the segment candidate equation for $CWGC_{CG1}$. The keyword "parental leave" also corresponds to Critical Group ID 1 for segment 7 of document A. However, in the current embodiment, the critical word group count value is only counted one for each segment of each document. Thus, CG1 in the equation is ½ (not 1). The second term in the user query is "disability" which corresponds to Critical Group ID 2 for segment 7 of document A. Subsequently, the indexing structure 420, in particular column five (5), is consulted to determine that the critical word group count value for CG2 for segment 7 of document A is ½. The ½ value is then populated into the segment candidate equation for $CWGC_{CG2}$. Furthermore, the user query term "litigation" is an exclusionary word. Subsequently, the indexing structure 420, in particular column six (6), is consulted to determine that the exclusionary count value is (−1). Now, inputting the values into the equation yields:

Seg 7,DocA VALUE=SUM(½+½)+(−1)=0 wherein $CWGC_{CG1}$=½ and $CWGC_{CG2}$=½ and exclusionary count is (−1). With the value being zero (0), segment 7 for document A is not a segment candidate for this user query. In other words, segment 7 for document A is excluded as a segment candidate because the exclusionary segment constraint (i.e., exclusionary group) includes the user query term "litigation" is an exclusionary keyword.

For segment 13 of document D, the keywords "California" and "state" are part of Critical Group ID 1 (CG1). The keyword "fmla" is part of Critical Group ID 2 (CG2). The first term in the user query is "fmla" which corresponds to Critical Group ID 1 for segment 13 of document D. Subsequently, the indexing structure 420, in particular column five (5), is consulted to determine that the critical word group count value for CG1 for segment 13 of document D is ½. This ½ value is then populated into the segment candidate equation for $CWGC_{CG1}$. Thus, there are no user query terms that are part of critical group ID 1 or an exclusionary group for segment 13 for document D. The terms "parental leave," "disability" and "litigation" do not correspond to any critical group or exclusionary group for segment 13 for document D. Thus, there are no user query terms that are part of critical group ID 1 and an exclusionary group for segment 13 for document D. Consequently, the $CWGC_{CG1}$ value is zero and the exclusionary count is zero for segment 13 for document D. Now, inputting the values into the segment candidate equation yields:

Seg 13,DocD VALUE=SUM(0+½)+0=½ wherein $CWGC_{CG1}$=0,$CWGC_{CG2}$=½ and exclusionary count is 0. With the value being ½, segment 13 for document D is not a segment candidate for this user query.

One skilled in that art should appreciate that the segment candidate equation may differ in some embodiments. For example, another segment candidate equation may be used that does not need to calculate fractions to determine segment candidates. Either way, the segment candidate equation should be used to determine which value or values are indicative of a segment being a candidate and which value or values are not indicative of the segment being a candidate. Referring again to step 504, the set of segment candidates may be temporarily or permanently stored in content database 124. Once the determination of segment candidates for the given user query is complete using the calculating module 142, the process executes step 506.

In step 506, the ranking module 143 ranks the set of segment candidates. The set of segment candidates may be ranked based upon a set of prioritized features. In other words, one or more features may be used to rank segments and some of those features may have a higher priority for ranking purposes. For example, if segment A and segment B have the same value for a first, highest priority ranking feature then the next feature or features decide how to rank segments A and B. The values needed to compare for ranking purposes may be calculated using the ranking module 143 and/or calculating module 142 and are stored in the content database 124. In addition, ranking the segments assumes that the exclusionary keywords that are part of the given user query have already limited the segment candidates (refer to working example #2 for an example). In one exemplary embodiment, the prioritized features are listed in descending order of priority and are discussed herein. Furthermore, exemplary segment candidates segment 3 of document A, segment 7 of document A, segment 12 of document B and segment 13 of document D are used to explain one or more of the prioritized features. A set of prioritized features may include at least one of:

1. Total number of critical groups for a given segment: distinct number of critical groups for a given segment. For example, segment 3 of document A may have 3 critical groups and segment 7 of document A has 2 critical groups (refer to segment 7 of document A concept groups 410 in FIG. 4). In this example, segment 3 of document A ranks higher than segment 7.
2. Total number of supplemental groups for a given segment: distinct number of supplemental groups for a given segment. For example, segment 3 of document A may have 3 supplemental groups and segment 12 of document B may have 2 supplemental groups. In this example, segment 3 of document A ranks higher than segment 12 of document B.
3. Critical keyword concentration in a given document:

$$\frac{\text{Number of segments that match a critical segment constraint for a user query}}{\text{Total number of segments in the document}}$$

There is an assumption that segments in documents that describe the user query terms at length are more valuable than segments in documents that describe the user query terms in passing. In addition, this feature is helpful for when two segments are from different documents. For example, document A may have 10 segments that match a critical segment constraint for a user query with an overall segment count of 100. Document A's critical keyword concentration is 0.10. If document B has 5 segments that match a critical segment constraint for a user query with an overall segment count of 10, then document B's critical keyword concentration is 0.50. In this example, the segment candidate or candidates associated with document B rank higher than segment candidate or candidates associated with document A.
4. Critical query coverage: percentage of user query terms matching keywords in critical groups. For example, assume the user query is "fmla disability child" and segment 12 of document B has "fmla" and "disability" in one or more critical groups. However, "child" is not found in any critical group for segment 12. The percentage for segment 12 is 2/3=0.6667 or 66.67%. Segment 3 of document A has "fmla," "disability" and "child" in one or more critical groups. The percentage for segment 3 of document A is 3/3=1 or 100%. Therefore, segment 3 of document A would be ranked higher than segment 12 of document B.
5. Supplemental query coverage: percentage of user query terms matching keywords in supplemental groups. For example, assume the user query is "fmla disability child" and segment 12 of document B has "fmla" and "disability" in one or more supplemental groups. However, "child" is not found in any supplemental group for segment 12. The percentage for segment 12 is 2/3=0.6667 or 66.67%. Segment 3 of document A has "fmla," "disability" and "child" in one or more supplemental groups. Therefore, the percentage for segment 4 is 3/3=1 or 100%. Therefore, Segment 3 of document A would be ranked higher than segment 12 of document B.
6. Segment location: the location of a segment in a document. In one embodiment, a hierarchical numbering of segments occurs within the document. For example, an overview segment is numbered 0. Level 1 segments are numbered integers from 1 to n (e.g., 3). Level 2 segments are numbered from x.1 to x.n where x is the number of level 1 parent (e.g., 3.2). Level 3 segments are numbered from x.1 to x.n where x is the number of level 2 parent (e.g., 3.2.3). Level 4 segments are numbered from x.1 to x.n where x is the number of level 3 parent (e.g., 3.2.3.1). Hierarchical levels may be determined editorially in the template 200 or automatically using systems and method known to those skilled in the art. In some embodiments, the higher the level location of the segment, the higher the score. For example, if segment 3 of document A is located at level 3.2.4 and segment 13 of document D is located at level 3.1, the segment 3 of document A would rank higher. This feature may also be used between two segments within the same document.
7. Number of critical keyword hits: number of critical keyword matches in a segment, even within the same group. For example, the user query is "fmla 'parental leave' disability." Referring back to segment 7 of document A concept groups 410, "fmla" and "parental leave" are in Critical Group ID 1 so the count for critical keyword matches in Critical Group ID 1 is 2. Then "disability" is in Critical Group ID 2 so the count for critical keyword matches in Critical Group ID 2 is 1. Therefore, the total number of critical keyword hits for segment 7 of document A is 2+1=3. Now for segment 13 of document D concept groups 415, "fmla" is in Critical Group ID 2 so the count for critical keyword matches in Critical Group ID 2 is 1. No other user query term matches a critical group within segment 13 of document D. Therefore, the total number of critical keyword hits for segment 13 of document D is 0+1=1. Thus, segment 7 would rank higher than segment 13.
8. Number of supplemental keyword hits: number of supplemental keyword matches in a segment, even within the same group. This is the same process as feature seven (7) except now instead of critical groups, supplemental groups are being used in the calculation.

In a ranking working example, a set of segment candidates may include four (4) segment candidates: segment 4 of document A, segment 8 of document A, segment 13 of document B and segment 14 of document D. The first and second features are calculated as explained previously and the values are as follows:

TABLE 1

| Segment/DocID | First Feature Value | Second Feature Value | Third Feature Value | Fourth Feature Value |
|---|---|---|---|---|
| Segment 4/DocA | 3 | 2 | 12/100 | 50% |
| Segment 8/DocA | 3 | 2 | 12/100 | 40% |
| Segment 13/DocB | 3 | 2 | 1/100 | Not Applicable |
| Segment 14/DocD | 2 | Not Applicable | Not Applicable | Not Applicable |

Given the values expressed in column two (2) of Table 1, segment 14 of document D is no longer a segment candidate after the first feature because it has less critical groups than the other candidates. Therefore, segment 14 of document D does not continue to the second feature assessment. The second feature value (column three (3)) does not help narrow down the remaining candidates because all of them have the same number of supplemental groups. The three remaining segment candidates now advance to the third and fourth, if applicable, feature. Given the values expressed in column four (4) of Table 1, segment 13 of document B is no longer a segment candidate after the third feature because it has a lesser value critical keyword concentration in the document than the other candidates. Therefore, segment 13 of document B does not continue to the fourth feature assessment. The fourth feature value helps narrow down the remaining segment candidates to the highest ranked segment candidate, segment 4 of document A, because it has a higher percentage of critical query coverage than segment 8 of document A. Thus, segment 4 of document A is the highest ranked segment candidate and, ultimately, may be displayed to the user.

In other embodiments, a value for every feature may be calculated before the ranking step 506 by the ranking module 143 or calculating module 142 and stored in the content database 124. Then the ranking method may start with comparing the previously calculated values of the first feature to see which candidate and/or candidates rise to the top. If there is more than one candidate with an equally high value, the process moves onto the already calculated values for the second feature and so on until only one segment candidate is left. Either way, once the set of segment candidates have been ranked by the ranking module 143, the process advances to step 208.

Figure 6:
FIG. 6 is an exemplary interface 600 which corresponds to one or more embodiments of the invention.

In step 508, the delivery module 144 provides a result. The result is associated with the set of segment candidates. In some embodiments, the result may be the highest ranked segment within the set of segment candidates. Furthermore, in some embodiments, the segment candidate that was the result may be ultimately displayed to the user in an exemplary interface such as interface 600. In particular, an exemplary result 610 is displayed in FIG. 6. Referring back to the ranking example, segment 4 of document A may be the exemplary result displayed. In addition, FIG. 6 shows the result as a truncated segment within a document. In other embodiments, the exemplary result may include but is not limited to a full text of the segment, a link to the segment, a listing of ranked segments, the document corresponding to the given segment and/or the like.

The embodiments described above and in the claims are intended only to illustrate and teach one or more ways of practicing or implementing the present invention, not to restrict its breadth or scope. For example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

The invention claimed is:

1. A computer-implemented method comprising:
receiving a user query comprising one or more query keywords;
in response to receiving the user query, automatically determining, using a processor, a set of segment candidates based on the user query and an indexing structure,
the indexing structure comprising a plurality of segment constraints associated with a corresponding segment candidate, the one or more segment constraints being one of a critical segment constraint, an exclusionary segment constraint and a supplemental segment constraint, wherein each of the one or more segment constraints comprises a listing of one or more critical keywords and at least one of one or more exclusionary keywords or one or more supplemental keywords,
said critical segment constraint comprising one or more textual words conveying a concept synonymous to the corresponding segment candidate, said exclusionary segment constraint comprising one or more textual words conveying a concept not synonymous to the corresponding segment candidate;
said determining comprising matching the one or more query keywords with the one or more critical keywords and the at least one exclusionary keyword or supplemental keyword of the corresponding segment candidate, said determining further comprising:
generating a critical word group count and an exclusionary count for each of the one or more critical keywords, and at least one exclusionary keyword or supplemental keyword;
generating a segment candidate based on a sum of the critical word group count and the exclusionary count;
ranking, using the processor, the set of segment candidates based on a total number of critical and supplemental segment constraints for each of the set of segment candidates to generate a ranked set of segment candidates stored in a memory and retrievable by a set of program code executed by the processor; and
providing a result associated with the ranked set of segment candidates.

2. The computer-implemented method of claim 1 further comprising excluding a segment based on the at least one segment constraint comprising the exclusionary keyword.

3. The computer-implemented method of claim 1 wherein ranking the set of segment candidates further comprises ranking each segment within the set of segment candidates is based on a set of prioritized features.

4. The computer-implemented method of claim 3 wherein the set of prioritized features includes at least one of:
a probability of a concentration of a set of critical keyword segments within a document;
a percentage of the user query that includes a set of critical keywords;
a percentage of the user query that includes a set of supplemental keywords;

a location of each segment within a corresponding document, each segment being within the set of segment candidates;
a number of critical keyword matches in a segment; and
a number of supplemental keyword matches in a segment.

5. The computer-implemented method of claim 4 wherein the set of prioritized features is in order of descending priority.

6. A system comprising:
a processor;
a memory coupled to the processor and storing instructions that, in response to receiving a user query comprising one or more query keywords, cause the processor to:
   determine, responsive to the user query, a set of segment candidates based on the user query and an indexing structure,
   the indexing structure comprising a plurality of segment constraints associated with a corresponding segment candidate, the one or more segment constraints being one of a critical segment constraint, an exclusionary segment constraint and a supplemental segment constraint, wherein each of the one or more segment constraints comprises a listing of one or more critical keywords and at least one of one or more exclusionary keywords or one or more supplemental keywords, said critical segment constraint comprising one or more textual words conveying a concept synonymous to the corresponding segment candidate, said exclusionary segment constraint comprising one or more textual words conveying a concept not synonymous to the corresponding segment candidate;
said determining comprising matching the one or more query keywords with the one or more critical keywords and the at least one exclusionary keyword or supplemental keyword of the corresponding segment candidate, said determining further comprising:
   generate a critical word group count and an exclusionary count for each of the one or more critical keywords, and at least one exclusionary keyword or supplemental keyword;
   generate a segment candidate based on a sum of the critical word group count and the exclusionary count;
rank the set of segment candidates based on a total number of critical and supplemental segment constraints for each of the set of segment candidates to generate a ranked set of segment candidates; and
provide a result associated with the ranked set of segment candidates.

7. The system of claim 6 wherein the processor is further configured to exclude a segment based on the at least one segment constraint comprising the exclusionary keyword.

8. The system of claim 6 wherein the processor in ranking the set of segment candidates is further configured to rank each segment within the set of segment candidates based on a set of prioritized features.

9. The system of claim 8 wherein the set of prioritized features includes at least one of:
a probability of a concentration of a set of critical keyword segments within a document;
a percentage of the user query that includes a set of critical keywords;
a percentage of the user query that includes a set of supplemental keywords;
a location position of each segment within a corresponding document, each segment being within the set of segment candidates;
a number of critical keyword matches in a segment; and
a number of supplemental keyword matches in a segment.

10. The system of claim 9 wherein the set of prioritized features is in order of descending priority.

\* \* \* \* \*